(12) United States Patent
Ray et al.

(10) Patent No.: US 11,503,962 B1
(45) Date of Patent: Nov. 22, 2022

(54) CUTTING BOARD DRAIN DEVICE

(71) Applicants: Larry Ray, Nesbit, MS (US); Travis Ray, Nesbit, MS (US); Troy Ray, Nesbit, MS (US)

(72) Inventors: Larry Ray, Nesbit, MS (US); Travis Ray, Nesbit, MS (US); Troy Ray, Nesbit, MS (US)

(*) Notice: Subject to any disclaimer, the term of this patent is extended or adjusted under 35 U.S.C. 154(b) by 0 days.

(21) Appl. No.: 17/683,471

(22) Filed: Mar. 1, 2022

(51) Int. Cl.
*A47J 47/00* (2006.01)
*A47J 43/28* (2006.01)

(52) U.S. Cl.
CPC .............. *A47J 47/005* (2013.01); *A47J 43/28* (2013.01)

(58) Field of Classification Search
CPC .................................................... A47J 47/005
See application file for complete search history.

(56) References Cited

U.S. PATENT DOCUMENTS

| | | | |
|---|---|---|---|
| 1,660,958 A | 2/1928 | Gloeker | |
| 2,447,788 A | 8/1948 | Ball | |
| 2,769,181 A | 11/1956 | Miller | |
| D259,656 S | 6/1981 | Alfrink | |
| 4,456,021 A | 6/1984 | Leavens | |
| D292,134 S | 9/1987 | McDaniel | |
| D415,661 S * | 10/1999 | Georgeovich | ................. D7/698 |
| 6,248,982 B1 | 6/2001 | Reid | |
| 2016/0213200 A1* | 7/2016 | Brown | .................. A47J 47/005 |
| 2017/0100848 A1* | 4/2017 | Berth | ................... B26D 7/2614 |
| 2019/0380543 A1* | 12/2019 | Bhargava | ................ B26B 27/00 |

FOREIGN PATENT DOCUMENTS

WO    WO0058572    10/2000

* cited by examiner

*Primary Examiner* — Nirvana Deonauth

(57) ABSTRACT

A cutting board drain device for being a cutting board with a food slicer attachment includes a cutting board which is positioned on top of a sink basin. The cutting board has a top surface protruding into the cutting board whereby defining a space for a variety of food items to be stored within. A support is coupled to a front edge of the cutting board and helps to retain the cutting board in a fixed position relative to a sink basin. A plurality of stubs is positioned on the bottom surface of the cutting board and assist in reducing movement within the sink basin. The top surface has a drain providing an outlet for a variety of liquids held within the top surface. A slicer is attached to the top surface and has a blade for portioning a variety of food items.

18 Claims, 4 Drawing Sheets

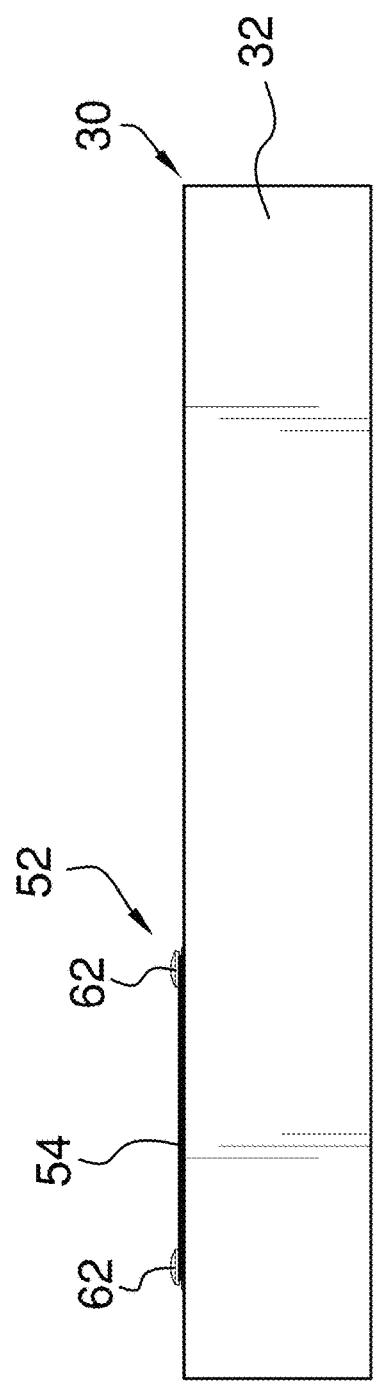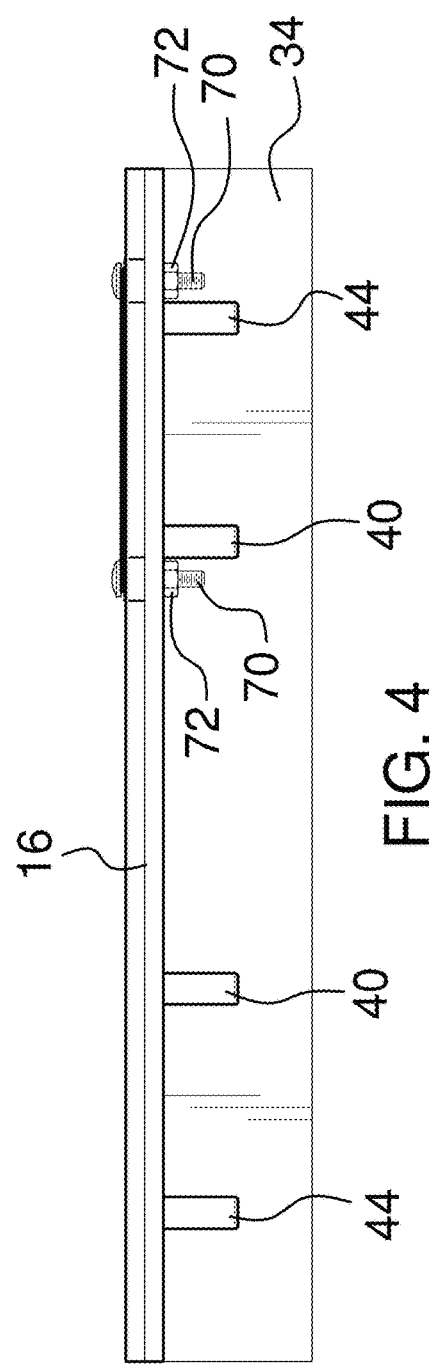

CUTTING BOARD DRAIN DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention

The disclosure relates to drain board sink attachments and more particularly pertains to a new drainboard sink attachment for being a cutting board with a food slicer attachment.

(2) Description of Related Art Including Information Disclosed Under 37 CFR 1.97 and 1.98

The prior art relates to drain board sink attachments. The prior art includes a variety of drain board sink attachments having a drain function configured for removing liquid from an area. Known prior art lacks a drain board sink attachment having both a drain function and a cutting board with a food slicer attachment.

BRIEF SUMMARY OF THE INVENTION

An embodiment of the disclosure meets the needs presented above by generally comprising a cutting board. The cutting board has a front edge, back edge, right edge, and left edge. The cutting board has a top surface protruding into the cutting board whereby defining a space for a variety of elements to be positioned within. The cutting board is configured for being positioned over a sink basin. A support has a top edge coupled to the front edge of the cutting board. The support has a peripheral surface and a back surface. The support is configured for positioning the peripheral surface facing the user and for positioning the back surface facing the outer surface of the sink basin. A plurality of stubs is positioned on a bottom surface of the cutting board. Each of the stubs protrudes out from the bottom surface and is configured for retaining the cutting board in a fixed position. A drain is positioned on the top surface and is configured for being an outlet to a variety of liquids. A slicer is a blade configured for cutting a variety of foods. The slicer has a pair of ends with each of the ends having an aperture. Each bolt of a pair of bolts is inserted into a respective one of each of the ends of the slicer.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 3 is a front view of an embodiment of the disclosure.

FIG. 4 is a back view of an embodiment of the disclosure.

DETAILED DESCRIPTION OF THE INVENTION

Figure 1:
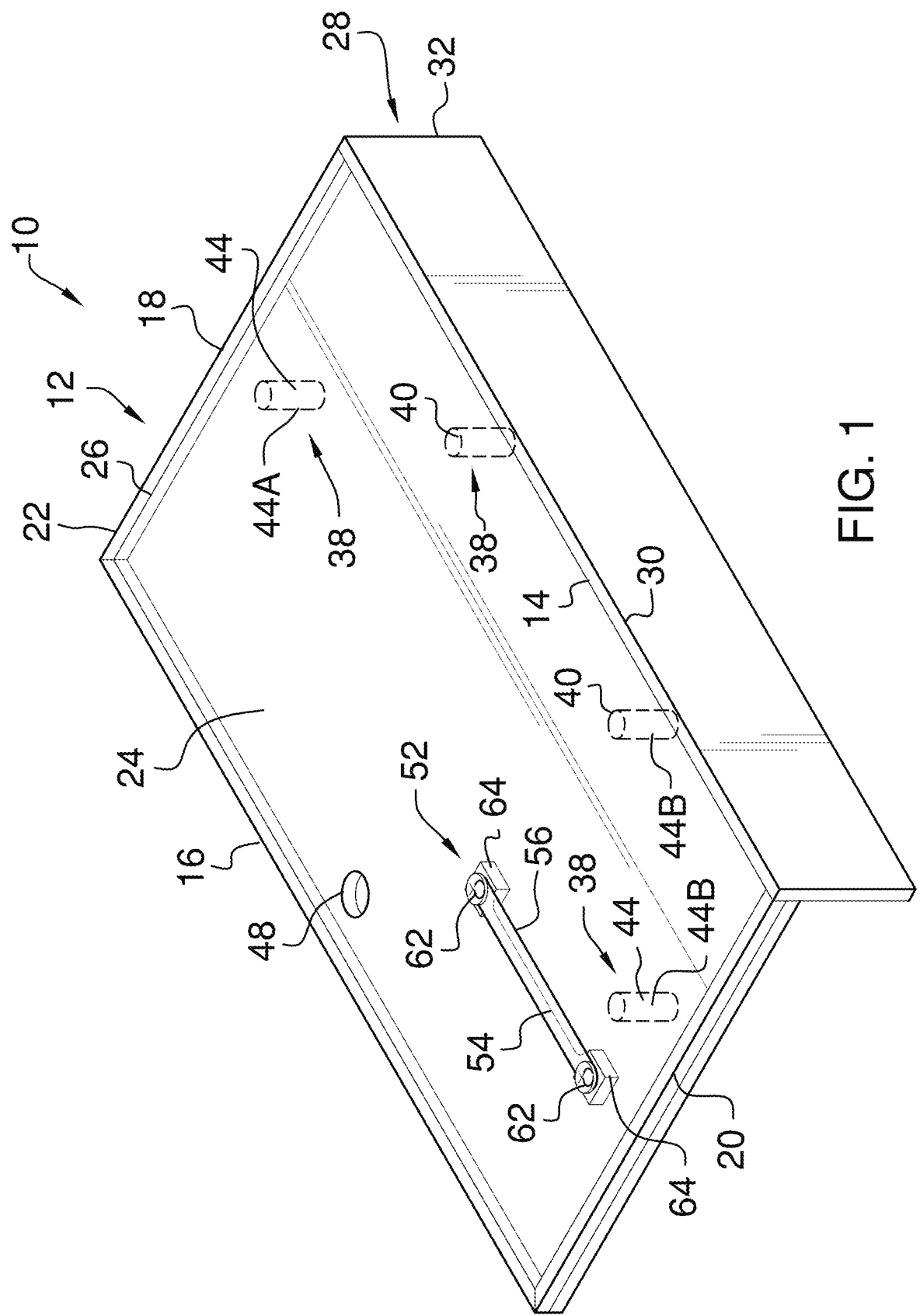
FIG. 1 is an isometric view of a cutting board drain device according to an embodiment of the disclosure.
Figure 2:
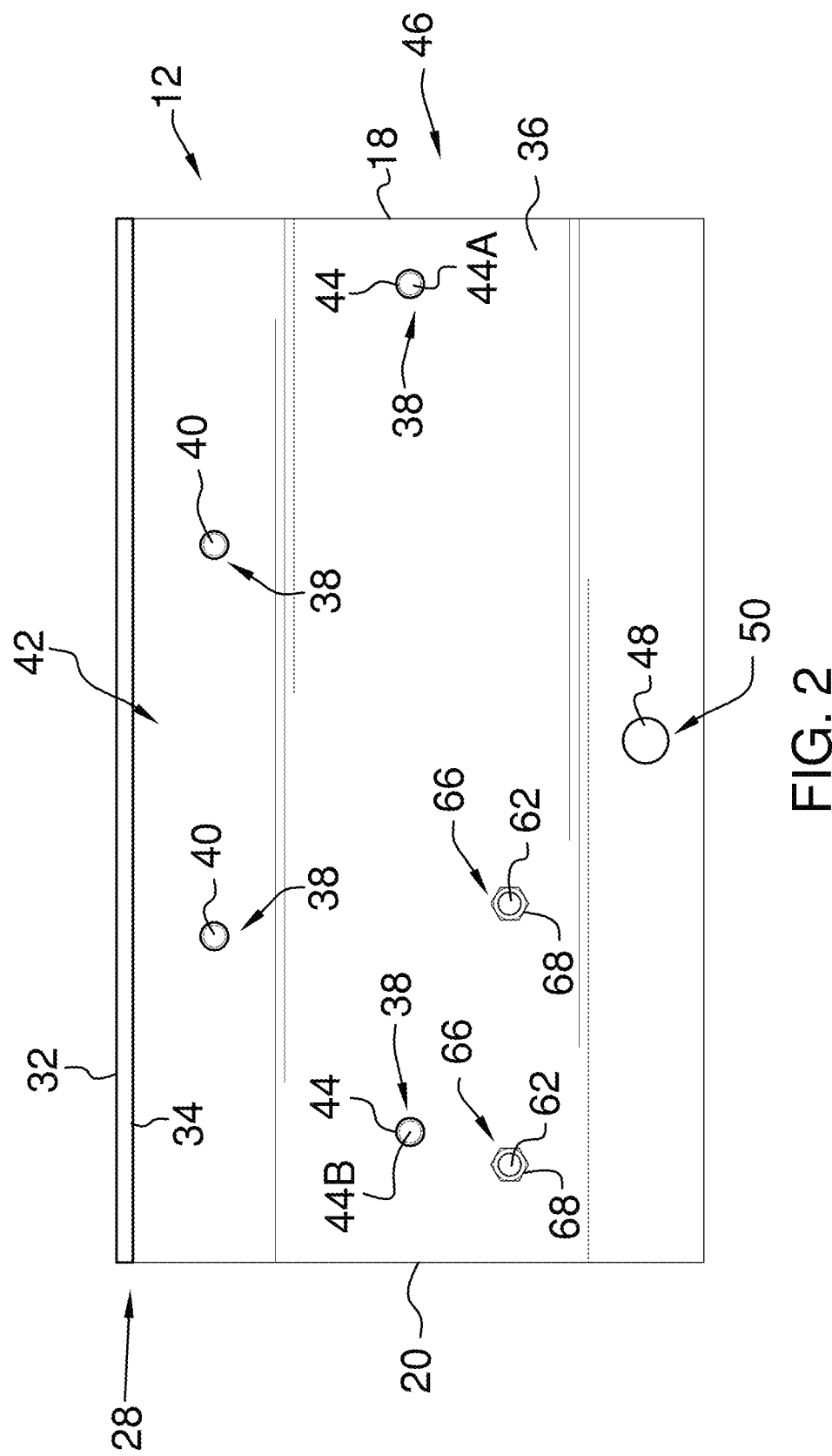
FIG. 2 is a bottom view of an embodiment of the disclosure.
Figure 5:
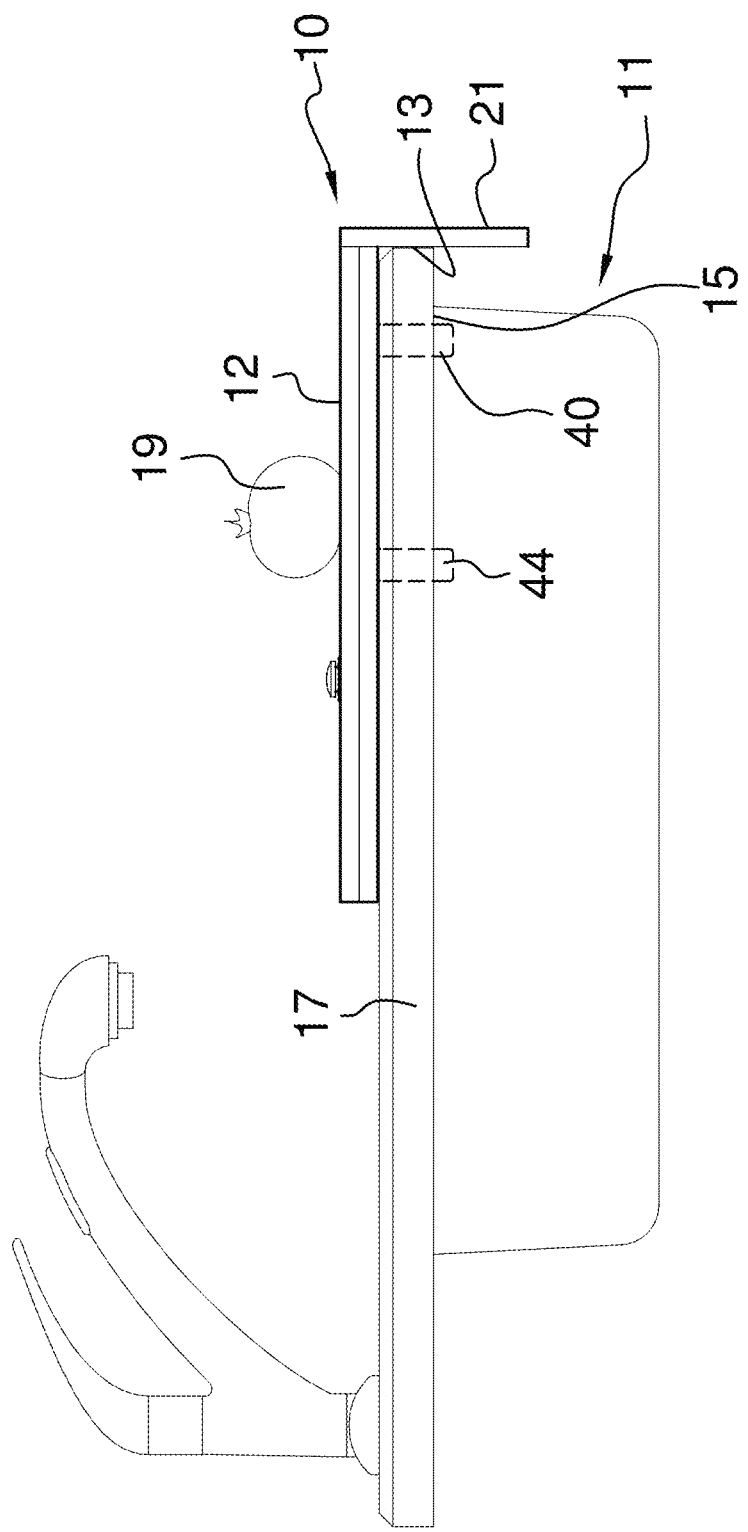
FIG. 5 is a side in-use view of an embodiment of the disclosure.

With reference now to the drawings, and in particular to FIGS. 1 through 5 thereof, a new drain board sink attachment embodying the principles and concepts of an embodiment of the disclosure and generally designated by the reference numeral 10 will be described.

As best illustrated in FIGS. 1 through 5, the cutting board drain device 10 generally comprises a cutting board 12. The cutting board 12 is a rectangular shape having a front edge 14 and a back edge 16. Furthermore, the front edge 14 and the back edge 16 are parallel to each other. The purpose of the cutting board is to be a durable material. The durable material defines a material that is resistant to abrasions from food preparation.

The cutting board 12 has a right edge 18 and a left edge 20. The right edge 18 and the left edge 20 are parallel to each other. The right edge 18 and the left edge 20 are perpendicular relative to the front edge 14 and the back edge 16. The positioning of right edge 18, left edge 20, front edge 14, and back edge 16 defines a perimeter 22 of the cutting board 12. The cutting board 12 has a top surface 24. The top surface 24 is rectangular and has an offset perimeter 26. The offset perimeter 26 is scaled down relative to the size of the perimeter 22 of the cutting board 12. The top surface 24 protrudes into the cutting board 12 and defines a space for a variety of elements to be positioned within. The cutting board 12 is configured for being positioned over a sink basin 11.

The cutting board drain device 10 has a support 28. The support 28 is a rectangular shape and has a top edge 30. The top edge 30 of the support 28 is coupled to the front edge 14 of the cutting board 12 and is secured in a fixed position relative to the cutting board 12. The support 28 is positioned perpendicular relative to the cutting board 12. Furthermore, the support 28 has a peripheral surface 32 and a back surface 34. The peripheral surface 32 is configured for being exposed to the user and to the environment. The purpose of the back surface 34 is to be positioned against the outside surface 13 of the sink basin 11. The support 28 is configured for retaining the cutting board 12 in a fixed position when the back surface 34 of the support 28 is positioned against the outside surface 13 of the sink basin 11.

A bottom surface 36 of the cutting board 12 has a plurality of stubs 38. Each of the stubs 38 is circular and protrudes out from the bottom surface 36. A pair of stubs 40 of the plurality of stubs 38 is positioned proximate to the front edge 14. The pair of stubs 40 is positioned parallel to the front edge 14. The pair of stubs 40 is positioned proximate to a center 42 of the front edge 14. The pair of stubs 40 is configured for assisting the support 28 with retaining the cutting board 12 in a fixed position relative to the sink basin 11. The pair of stubs 40 is configured for being positioned against an interior surface 15 of the sink basin 11. A second pair of stubs 44 of the plurality of stubs 38 is positioned in a center 46 of the bottom surface 36 of the cutting board 12.

A right stub 44A of the second pair of stubs 44 is positioned proximate to the right edge 18 of the cutting board 12. A left stub 44B of the second pair of stubs 44 is positioned proximate to the left edge 20 of the cutting board 12. The second pair of stubs 44 is configured for being pressed against the side surfaces 17 of the sink basin 11 whereby aiding in the retaining of the cutting board 12 from movement.

The top surface 24 of the cutting board 12 has a drain 48. The drain 48 is an aperture and is circular. The drain 48 is positioned proximate to a center 50 of the back edge 16 of the cutting board 12. The drain 48 is configured for being an outlet to a variety of liquids held within the top surface 24 of the cutting board 12.

A slicer 52 is positioned on the top surface 24 of the cutting board 12. The slicer 52 is a blade 54 and has a rectangular shape. The blade 54 has an edge 56. The edge 56 is sharp and is configured for portioning a variety of food items 19 when each of the food items 19 is forced against the blade 54. The slicer 52 has a pair of ends 58. Each of the ends 58 has an aperture 60. The aperture 60 is circular and is configured for a bolt to be inserted within. Each bolt 62 of a pair of bolts 62 is inserted into a respective one of the aperture 60 of each of the ends 58 of the slicer 52. Each of the bolts 62 has a spacer 64. The spacer 64 is enwrapped around each bolt 62 of the pair of bolts 62 and is configured for providing a clearance between the top surface 24 and the blade 54 of the slicer 52.

The top surface 24 has a pair of holes 66. Each of the holes 66 is an aperture and is circular. The pair of holes 66 is configured for holding the pair of bolts 62 of the slicer 52 whereby securing the slicer 52 to the top surface 24 of the cutting board 12. The pair of holes 66 is concentric to the aperture 60 of each end 58 of the pair of ends 58 of the slicer 52.

Each of the bolts 62 has a bolt nut 68. The bolt nut 68 is configured for enwrapping around the end of each of the bolts 62 to assist in retaining the pair of bolts 62 within the pair of holes 66 of the top surface 24. Each of the bolts 62 has an exterior threading 70 and the bolt nuts 68 have interior threading 72. Each of the bolts 62 is complementary to the bolt nut 68 of each of the bolts 62 and is configured for engaging by threading to the bolt nuts 68.

In use, the cutting board 12 is positioned over the sink basin 11. The back surface 34 of the support 28 is positioned against the outside surface 13 of the sink basin 11. The pair of stubs 40 of the bottom surface 36 of the cutting board 12 is positioned against the inside surface 15 of the sink basin 11. The second pair of stubs 44 is positioned against the side surfaces 17 of the sink basin 11 whereby retaining the cutting board 12 from movement. The top surface 24 of the cutting board 12 can hold a variety of food items 19 to be prepared. Furthermore, the variety of food items 19 can be portioned using the slicer 52. The slicer 52 is an optional element and can be removed from the cutting board 12. The drain 48 provides an outlet to a variety of liquids or solids that are not needed on the top surface 24 of the cutting board 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:
1. A cutting board drain device comprising:
   a cutting board, said cutting board having a front edge and a back edge, said cutting board having a right edge and a left edge, said cutting board having a top surface, said top surface recessed into said cutting board whereby defining a space for a variety of elements to be positioned within, said cutting board being configured for being positioned over a sink basin;
   a support, said support having a top edge, said top edge of said support being coupled to said front edge of said cutting board, said support having a peripheral surface and a back surface, said support being configured for positioning said peripheral surface facing a user and for positioning said back surface facing an outside surface of the sink basin;
   a plurality of stubs, each of said stubs being positioned on a bottom surface of said cutting board, each of said stubs protruding out from said bottom surface, a pair of stubs of the plurality of stubs being configured for retaining said cutting board in a fixed position when said back surface of said support is positioned against the outside surface of the sink basin;
   a drain, said drain being positioned on said top surface, said drain being configured for being an outlet to a variety of liquids within said top surface whereby removing the variety of liquids from said top surface into the sink basin; and a slicer, said slicer being a blade, said blade being configured for cutting a variety of foods, said slicer having a pair of ends, each of said ends having an aperture, each said aperture being configured for lodging a bolt within, each bolt of a pair of bolts being inserted into a respective one of each of said ends of said slicer, an end of each of said bolts being inserted into each hole of a pair of holes positioned on said top surface, each of said bolts being configured for securing said slicer to said top surface of said cutting board.

2. The cutting board drain device of claim 1, further comprising said cutting board being a rectangular shape.

3. The cutting board drain device of claim 1, further comprising said front edge and said back edge being parallel to each other.

4. The cutting board drain device of claim 1, further comprising said right edge and said left edge being parallel to each other and being perpendicular to said front edge.

5. The cutting board drain device of claim 1, further comprising said top surface being a rectangular shape.

6. The cutting board drain device of claim 1, further comprising said support being a rectangular shape.

7. The cutting board drain device of claim 1, further comprising said support being positioned perpendicular relative to said cutting board.

8. The cutting board drain device of claim 1, further comprising each of said stubs being circular.

9. The cutting board drain device of claim 1, further comprising the pair of stubs of said plurality of stubs being positioned proximate to said front edge.

10. The cutting board drain device of claim 1, further comprising a second pair of stubs of said plurality of stubs being positioned in a center of said bottom surface, each stub of said second pair of stubs being positioned proximate to a respective one of said right edge and said left edge, said second pair of stubs being configured for retaining said cutting board from movement when attached to the sink basin.

11. The cutting board drain device of claim 1, further comprising said drain being an aperture, said drain being circular, said drain being positioned proximate to said back edge.

12. The cutting board drain device of claim 1, further comprising said drain being positioned equal distance in between said right edge and said left edge.

13. The cutting board drain device of claim 1, further comprising said slicer being a rectangular shape.

14. The cutting board drain device of claim 1, further comprising each said aperture being circular.

15. The cutting board drain device of claim 1, further comprising each of said bolts having a spacer, each said spacer being enwrapped around each of said bolts, each said spacer being configured for producing a clearance between said blade and said top surface of said cutting board.

16. The cutting board drain device of claim 1, further comprising each of said holes being an aperture.

17. The cutting board drain device of claim 1, further comprising each of said bolts having a bolt nut, each said bolt nut being enwrapped on each of said bolts, each said bolt nut being configured for holding each of said bolts in a fixed position within each of said hole.

18. A cutting board drain device comprising:

a cutting board, said cutting board being a rectangular shape, said cutting board having a front edge and a back edge, said front edge and said back edge being parallel to each other, said cutting board having a right edge and a left edge, said right edge and said left edge being parallel to each other and being perpendicular to said front edge, said cutting board having a top surface, said top surface being a rectangular shape, said top surface recessed into said cutting board whereby defining a space for a variety of elements to be positioned within, said cutting board being configured for being positioned over a sink basin;

a support, said support being a rectangular shape, said support having a top edge, said top edge of said support being coupled to said front edge of said cutting board, said support being positioned perpendicular relative to said cutting board, said support having a peripheral surface and a back surface, said support being configured for positioning said peripheral surface facing a user and for positioning said back surface facing an outside surface of the sink basin;

a plurality of stubs, each of said stubs being circular, each of said stubs being positioned on a bottom surface of said cutting board, each of said stubs protruding out from said bottom surface, a pair of stubs of said plurality of stubs being positioned proximate to said front edge, said pair of stubs being configured for retaining said cutting board in a fixed position when said back surface of said support is positioned against the outside surface of the sink basin, a second pair of stubs of said plurality of stubs being positioned in a center of said bottom surface, each stub of said second pair of stubs being positioned proximate to a respective one of said right edge and said left edge, said second pair of stubs being configured for retaining said cutting board from movement when attached to the sink basin;

a drain, said drain being an aperture, said drain being circular, said drain being positioned on said top surface, said drain being positioned proximate to said back edge, said drain being positioned equal distance in between said right edge and said left edge, said drain being configured for being an outlet to a variety of liquids within said top surface whereby removing the variety of liquids from said top surface into the sink basin; and a slicer, said slicer being a blade, said blade being configured for cutting a variety of foods, said slicer being a rectangular shape, said slicer having a pair of ends, each of said ends having an aperture, each said aperture of said slicer being circular, each said aperture of said slicer being configured for lodging a bolt within, each bolt of a pair of bolts being inserted into a respective one of each of said ends of said slicer, each of said bolts having a spacer, each said spacer being enwrapped around each of said bolts, each said spacer being configured for producing a clearance between said blade and said top surface of said cutting board, an end of each of said bolts being inserted into each hole of a pair of holes positioned on said top surface, each of said holes being an aperture, each of said bolts having a bolt nut, each said bolt nut being enwrapped on each of said bolts, each said bolt nut being configured for holding each of said bolts in a fixed position within each of said hole, each of said bolts being configured for securing said slicer to said top surface of said cutting board.

* * * * *